United States Patent [19]

Wampfler et al.

[11] 3,920,735

[45] Nov. 18, 1975

[54] ZIRCONIUM ENHANCED ACTIVITY OF TRANSITION METAL-BROMINE CATALYSIS OF DI- AND TRIMETHYL BENZENE OXIDATION IN LIQUID PHASE

[75] Inventors: Gene L. Wampfler, Lombard; Gregory E. Croft, Oak Park, both of Ill.

[73] Assignee: Standard Oil Company, Chicago, Ill.

[22] Filed: May 21, 1973

[21] Appl. No.: 362,464

[52] U.S. Cl........ 260/524 R; 260/343.3; 260/515 R
[51] Int. Cl.² .................... C07C 51/33; C07C 63/16
[58] Field of Search ................................ 260/524 R

[56] References Cited
UNITED STATES PATENTS

| | | | |
|---|---|---|---|
| 3,299,125 | 1/1967 | Ichikawa et al. | 260/524 R |
| 3,562,318 | 2/1971 | Barone | 260/524 R |
| 3,607,919 | 9/1971 | Barone | 260/524 R |

*Primary Examiner*—Robert Gerstl
*Assistant Examiner*—Richard D. Kelly
*Attorney, Agent, or Firm*—Fred R. Ahlers; Arthur G. Gilkes; William T. McClain

[57] ABSTRACT

Addition of non-transitional zirconium ion to oxidation catalysis provided by heavy, transition metal-bromine ion combination containing at least manganese ion uniquely increases catalytic activity of said combination for converting methyl groups to carboxylic acid groups on benzene nucleus by a factor much greater than by the addition of equivalent amount of such high catalytically active heavy, transition metal as cobalt or manganese. Such greater catalytic activity is manifested by longer sustained initial rapid rate of oxygen consumption.

6 Claims, No Drawings

ZIRCONIUM ENHANCED ACTIVITY OF TRANSITION METAL-BROMINE CATALYSIS OF DI- AND TRIMETHYL BENZENE OXIDATION IN LIQUID PHASE

BACKGROUND OF INVENTION

The possibility of using liquid phase instead of vapor phase oxidation for the preparation of benzene carboxylic acids was first indicated by the disclosure in U.S. Pat. No. 2,245,528 of the catalysis provided by transitional or variable valence metals, especially cobalt, in a liquid phase of saturated lower aliphatic acid at temperatures from 100° to 320°C. and pressures to maintain the liquid phase of the aliphatic acid. Such catalysis, according to said patent, was advantageously promoted by the use of a ketone such as methylethyl ketone or aldehyde such as acetaldehyde. Unfortunately such aldehyde or ketone promoted variable valence metal catalysis was useful only for converting mono-, di- and tri- methylbenzenes to their respective benzene monocarboxylic acids: benzoic, toluic and dimethyl benzoic acids. Two separate, later and somewhat parallel lower temperature (80°–100°C.) modifications of the aldehyde or ketone promoted cobalt catalysis in liquid phase of acetic acid did provide commercially feasible conversion of xylenes to phthalic acids, especially p-xylene to terephthalic acid but only at the expense of using rather high concentrations of cobalt and molar, with respect to p-xylene, quantities of acetaldehyde or methylethyl ketone promoter which were oxidized to acetic acid.

The disadvantages of using high concentrations of cobalt promoted with large quantities of aldehyde or ketone were overcome, and at the same time a greater choice of variable valence metal oxidation catalyst was made available, and a wider choice of alkyl-substituted benzene starting materials for benzene di-, tri- and higher carboxylic acids was provided by the discovery of the unique promotional effect on said variable valence metals by the bromine ion, provided per se or formed in situ with or without acidic reaction medium provided by $C_1$–$C_8$ monocarboxylic acids having no hydrogens on a tertiary carbon such as benzoic acid and the saturated aliphatic monocarboxylic acids, preferably acetic acid. Such bromine-variable valent metal catalysis, first disclosed in U.S. Pat. No. 2,833,816, also provided, under liquid phase conditions over the temperature range of 120°–275°C., a substantially higher rate of oxidation (e.g. reaction duration of 2 hours or less for conversion of xylenes to high yields of phthalic acids) of alkyl side chains on the benzene ring to nuclear-substituted carboxylic acid groups and was not limited to such oxidative conversion of methyl side chains but rather also applied to much longer side chains. Also the unique effect of bromine ion was not limited to cobalt as variable valence metal but applied in general to polyvalent metals which have atomic weights in the range between 50 and 200. Such unique effect of bromine was most pronounced when used in combination with cobalt, manganese, cerium (the metals of known highest oxidation potential) and with combinations of two or more of those polyvalent metals. Combinations of cobalt and manganese with a source of bromine became preferred for commercial use. However, said patent also indicated that bromine had some unique effect on metals normally considered as having valencies which are nonvariable. For example, use of bromine-bismuth catalysis caused selective oxidation of the isopropyl-substituent of p-cymene to the exclusion of oxidation of the methyl-substituent to yield p-toluic acid.

The bromine-polyvalent metal catalysis in acetic acid solvent has been in commercial use in many countries for the manufacture of terephthalic acid from p-xylene for more than 14 years and has progressed to the point of producing a crude terephthalic acid product of 99.5–99.6 weight percent purity in yields of 94–96 percent of theory in reaction durations of 40–60 minutes. But, in the absence of acetic acid solvent, best yield of a single phthalic acid (e.g. terephthalic acid) on a once through basis of the xylene amounted, according to U.S. Pat. No. 2,833,816 to about 20 weight (12.8 mole) percent. Most development attention to achieve such high commercial yields and quality has been given to the catalysis afforded by combinations of bromine with mixtures of cobalt and manganese as polyvalent metal components of the catalysis. However, no attention has been given to the effect on such otherwise highly effective catalysis by metals whose valencies, in general, have been considered to be nonvariable in spite of earlier indications that bromine, unique of the promoters, tended to promote them from no activity to some activity as oxidation catalysts.

INVENTION SUMMARY

For liquid phase oxidation of di- and trimethylbenzenes with molecular oxygen it has been discovered that zirconium is unique among the Group IVB metals for substantially enhancing the activity of the bromine-manganese or bromine-manganese-cobalt systems of catalysis. There are two aspects of the enhancement by zirconium. The first is an increase in activity of Mn—Br or Mn—Co—Br systems of catalysis by a factor much greater than would be expected by increase of amounts of either Mn and/or Co equivalent to the amount of zirconium employed. The second is manifested by the longer sustained initial rapid rate of oxygen consumption when zirconium is a member of the systems of catalysis than when the catalysis systems comprise Mn—Br or Mn—Co—Br.

Such functions of zirconium are indeed unobvious when the character and nature of it are considered and compared to Mn and/or Co which have been known for some time to have the highest oxidation potential of the transition metals characterized in U.S. Pat. No. 2,425,528 as oxidation catalysts. Zirconium is not generally considered to be a transition metal in a redox system as are Co, Mn and other of such metal oxidation catalysts because of its non-variable valence state in oxidation systems.

It is appreciated that combinations of cobalt with Group IIIA or Group IVA metals without alkyl side chain oxidation initiators or promotors are taught in U.S. Pat. No. 3,299,125 as beneficial systems of catalysis for the liquid phase oxidation of alkyl-substituted aromatic hydrocarbon containing two or more alkyl groups which are not nuclear substituted on carbons in ortho positions with respect to each alkyl group. Thus the Co—Zr system of catalysis is taught as ineffective for di- and trialkylbenzenes such as o-xylene or pseudocumene (1,2,4-trimethylbenzene).

It is further appreciated that U.S Pat. No. 3,562,318 teaches for liquid phase oxidation of alkyl-substituted aromatic compounds in the presence of aldehyde or ketone side chain oxidation initiators or promoters the beneficial effect of cobalt in combination with one or more metals of the group consisting of Al, Zr, La, Nd, Zn, B or Mg.

Canadian Pat. No. 829,343, it is further appreciated, adds for the ketone or aldehyde side chain, oxidation initiation or promotion for liquid phase oxidation of alkyl-substituted aromatic hydrocarbons the beneficial effect of cobalt-niobium system of catalysis.

According to each of three foregoing prior teachings very high levels of cobalt concentrations are required in the liquid phase containing acetic acid as reaction solvent. But, even then, the oxidation rates are inordinately slow and make the disclosed combinations of systems of catalysis commercially unattractive. Such systems of catalysis are even more unattractive commercially when compared against the most widely used, on a world-wide basis, commercial catalysis which uses relatively low concentrations of components of the Mn—Br, Co—Br and Mn—Co systems of catalysis resulting in tere- or isophthalic acid yields of 92–95 mole percent of a purity of 99–99.5% from oxidations conducted on a continuous basis with xylene residence time in the range of 40–50 minutes.

In such continuous operations the catalysis components are used in the range of 1.0 to 2.0 milligram atoms of total metal (i.e., total of Co or Mn or Co and Mn as the metals although charged as metal salts) and 1.0 to 2.0 milligram atoms of bromine (calculated as the element although charged as a bromine-containing compound) per gram-mole of p- or m-xylene. The oxidation of di- and trimethyl substituted benzenes having two nuclear substituted methyl groups (i.e., o-xylene and pseudocumene) require slightly higher total concentrations of the metals Co and Mn and higher concentrations of bromine. Thus for o-xylene oxidation the total concentration of metals (Co, Mn or Co—Mn) are 2.0 to 4.0 milligram atoms and the bromine concentrations are also 2.0 to 4.0 milligram atoms per gram-mole of o-xylene. For pseudocumene oxidation the total metals (Co, Mn and Co—Mn) concentration is 2.25–5.0 milligram atoms and bromine concentration is 4.5–10.0 milligram atoms per gram-mole of pseudocumene.

SPECIFIC EMBODIMENTS

For the present invention the ratio of zirconium to total conventional metal oxidation catalysts (Mn, Co and Mn—Co) is in the range of respective metals (i.e., Zr: total conventional metals) of 0.1–3.0:1.0 on a milligram atom basis. The ratio of total metals, Zr plus conventional oxidation metals to bromine is in the range of 0.5 to 2.8:1.0 on the milligram atom basis. Thus for each gram-mole of m- or p-xylene in the oxidation there is used from 0.1 to 6.0 milligram atom zirconium, 1.0–2.0 milligram atoms total of Mn or Mn—Co and from 0.2–4.0 milligram atoms bromine. For each gram-mole o-xylene there is used 1.0 to 3.0 milligram atoms zirconium, 2.0–6.0 milligram atoms total of Mn or Mn—Co and 3.0–9.0 milligram atoms bromine. For each gram mole pseudocumene there is used 3.0–6.0 milligram atoms bromine, 1.0–2.0 milligram atoms zirconium and 2.25–5.0 milligram atoms total of Mn or Mn—Co. As will be hereinafter demonstrated, to obtain the unique effects of zirconium the conventional metal oxidation catalyst must contain at least 20 percent manganese. Preferably, manganese should be from 20 to 100 percent of the total of Mn and Co.

Zirconium can be added to the reaction in any form soluble in the di- or trimethylbenzene being oxidized or in acetic acid when it is being used as reaction solvent. For example, zirconium octanoate or naphthanate can be used with manganese and cobalt octanoates or naphthanics for oxidation of the di- or trimethylbenzenes in the absence of reaction solvent and each of Zr, Mn and Co can be conveniently used as their acetates when di- or trimethylbenzenes are oxidized in the presence of acetic acid solvent. Zirconium is available on a commercial basis as a solution of $ZrO_2$ in acetic acid and as such is ideally suited for liquid phase oxidations using acetic acid as reaction solvent.

The source of molecular oxygen for the Zr enhanced oxidation of this invention can vary in $O_2$ content from that of air to oxygen gas. Air is the preferred source of molecular oxygen for oxidations conducted at temperatures at 150° and above up to 275°C. For oxidations conducted with molecular oxygen the preferred temperatures are in the range of 130° to 200°C. The minimum pressure for such oxidations is that pressure which will maintain a substantial liquid phase 70–80%, of the reaction medium either neat di- or trimethylbenzene or such methylbenzene and 70–80% of the acetic acid. The acetic acid solvent, when used, can amount to 1–10 parts on weight basis per part of the di- or trimethylbenzene. The methylbenzene and/or acetic acid not in the liquid phase because of vaporization by heat of reaction is advantageously condensed and the condensate returned to the oxidation as a known means for removing heat and thereby temperature controlling the exothermic oxidation reaction. Such vaporization of methylbenzene reactant and/or acetic acid solvent is also accompanied by vaporization of lower boiling by-product water. When it is desired to take advantage of the known benefits of control of water concentration in oxidation, condensed water is separated from the condensate before its return to the oxidation reaction by any one of the well known means for accomplishing such separation of water; for example, by phase separation of liquid water from the methylbenzene condensate or by distillative separation of water from acetic acid.

The benefits to be derived from the use of zirconium according to the present invention are indicated by results shown with respect to the following illustrative and comparative oxidations using o-xylene or p-xylene as the methyl-substituted benzene to be oxidized.

In the examples to follow all oxidations are conducted at a gauge pressure of 300 pounds per square inch (psig) and at oxidation initiation temperature of 350°F. using a weight ratio of acetic acid to xylene of 3:1 and using air as the source of molecular oxygen. Two different oxidation reactors are used. One, designated F-81, is an unstirred titanium tubular reactor having an internal diameter of 1.0 inch and a height of 36 inches of which the upper portion is a water cooled condensation zone. The other, designated F-71 is a stirred titanium autoclave of two liter volume having a water cooled overhead condenser and condensate reflux return to the autoclave. Both oxidation apparatus also have, following their respective condensation systems, means for venting the exhaust gaseous mixture (nitrogen, unused or excess oxygen, oxides of carbon, water vapor, and vapor of uncondensed acetic acid) and analytical means for determining the oxygen, carbon dioxide and carbon monoxide contents of exhaust sample on acetic acid-free dry basis. The exhaust sample flows through a super-cooled (e.g. dry ice - acetone cooled) trap before analysis for $O_2$, $CO_2$ and CO. Because of their differences in capacity reactor F-81 is charged with 50 grams xylene, thus 150 grams acetic acid, and F-71 is charged with 250 grams xylene, hence 750 grams acetic acid, for said 3:1 solvent to methyl-substituted benzene weight ratio. Pseudocumene is also oxidized in the smaller F-81 reactor using 50 grams and 150 grams acetic acid as solvent. Also the o-xylene oxidations were conducted in the smaller F-81 reactor. The oxidations of both o-xylene and pseudocumene are conducted batchwise but the oxidations of p-xylene are conducted in a semi-continuous manner in both F-81 reactor and F-71 reactor.

The batchwise oxidations are conducted by charging all of the catalyst components, o-xylene (or pseudocumene) and acetic acid to F-81 reactor; sealing the reactor; setting a pressure control valve to 300 psig (valve is in exhaust vent line); pressuring the reactor to 300 psig with nitrogen; heating the reactor contents to 350°F.; and then introducing pressurized air into the liquid phase in the reactor. Cooling water at 50°F. is introduced into the jacket of the condenser section. Each oxidation is terminated as close to 10% oxygen by volume as is feasible to do. It will be understood that the oxygen content in the exhaust gas (dry and free of acetic acid) can rapidly increase when oxidation ceases. The attempted termination of oxidation at 10% oxygen (about half-way to oxygen content of air) is for the purpose of determining the effect of zirconium during the most rapid oxygen consumption by the methyl-substituted benzene reactant because thereafter, even though oxygen concentration is maintained at a substantially constant concentration in the liquid phase, oxygen consumption naturally diminishes directly with disappearance of oxidizable substituents on the benzene ring and catalytic effect becomes more difficult to evaluate.

The semi-continuous oxidations of p-xylene are conducted by charging to either F-81 or F-71 reactor all the acetic acid and catalyst components but only 10% of the p-xylene to be used. After setting the pressure control valve at 300 psig and pressurizing the reactor with nitrogen to said pressure, the reactor contents are heated to 350°F. and pressurized air is introduced into the liquid phase for about one minute. Thereafter, while continuing introduction of air, the remaining p-xylene is pumped into the liquid phase at a uniform rate. After pumping in all of the 90% charge, the air introduction is continued either to 10% oxygen volume in exhaust (dry, acetic acid free basis) for the same purpose as mentioned above or to 18% oxygen by volume (on the same basis) to determine the total effect of zirconium beyond maximum oxygen consumption rate which occurs most uniformly throughout pumping of p-xylene. Uniform rates of pumping, 384 ml/hr to F-71 reactor and 128 ml/hr to F-81 reactor are maintained for the p-xylene oxidations.

After termination of the oxidations, the total reactor effluents (hereafter "TRE") are drained and collected. The reactor for the o-xylene and pseudocumene oxidations is washed with acetic acid and each wash is combined with its respective TRE. After draining the TRE from p-xylene oxidations, the reactors are washed with caustic to remove adhering solids, each caustic wash is separately collected, acidified with hydrochloric acid, and the resulting precipitate is recovered by filtration and added to the respective oxidation's TRE. The resulting TRE products are submitted for polarographic, neutrals and aromatic acid analysis and for determination of fluorescence and optical density (measured on standardized aqueous solution of ammonium salt of terephthalic acid in 4 ml cell) only for such properties of maximized oxidation to 18% oxygen in exhaust.

Product yields from F-81 reactor are calculated (and hereafter reported) in mole percent of product per mole xylene or pseudocumene charged. But product yields from F-71 reactor are calculated (and hereafter reported) in mole percent of product per mole p-xylene reacted because of loss of xylene caused by higher air input rate to F-71 autoclave reactor than to F-81 tubular reactor. For oxidations conducted in F-71 reactor a benzene ring balance can be used as a measure of such xylene loss.

Other pertinent details of the illustrative oxidations and the results so produced are presented hereafter in Tables I-IV. Zirconium is used as its tetrabromide but other acetic acid soluble zirconium compounds can be used. Cobalt and manganese are used as their acetate tetrahydrates. The source of bromine, when no Zr is used, in tetrabromoethane but other bromine sources; e.g., HBr, $Br_2$, KBr, NaBr, $NH_4Br$, benzyl bromide, etc, can be used.

TABLE I

| ZIRCONIUM EFFECT ON ORTHO-XYLENE OXIDATION | | | | | |
|---|---|---|---|---|---|
| Example | A | 1 | B | C | 2 |
| mg atom Zr/mole ox | 0 | 1.0 | 3.0 | 1.5 | 1.5 |
| mg atom Co/mole ox | 1.0 | 1.0 | 0 | 1.5 | 0 |
| mg atom Mn/mole ox | 1.0 | 1.0 | 0 | 0 | 1.5 |
| mg atom Br/mole ox | 2.0 | 4.0 | 12.0 | 6.0 | 6.0 |
| Total mg atom metals/mg atom Br | 1.0 | 0.75 | 0.25 | 0.5 | 0.5 |
| Conditions | | | | | |
| Average Run Temp., °F. | 411 | 411 | 431 | 417 | 412 |
| Run Time, Min. | 24 | 44 | 47 | 15 | 44 |
| Final % $O_2$ in Vent | 10 | 13.1 | 18 | 19.2 | 12.5 |
| Results | | | | | |
| $O_2$ uptake, liters | 21.8 | 37.4 | 10.1 | 0 | 33.7 |
| liter $CO_2$/liter $O_2$ | 0.100 | .125 | .188 | 0 | .163 |
| Molar, Yields, % | | | | | |
| o-phthalic acid | 15.0 | 77.5 | NA[1] | NA[1] | 75.3 |
| o-Toluic acid | 35.1 | 0.7 | | | 1.4 |
| 2-carboxybenzaldehyde | 7.2 | 0.7 | | | 0.8 |
| phthalide | 9.8 | 0.5 | | | 1.2 |
| Total intermediates[2] | 63.6 | 3.0 | | | 4.0 |
| C-7 Aromatics | 0.7 | 1.5 | | | 1.9 |

TABLE I-continued

| | ZIRCONIUM EFFECT ON ORTHO-XYLENE OXIDATION | | | | |
|---|---|---|---|---|---|
| Example | A | 1 | B | C | 2 |
| C-9 Aromatics | 1.5 | 0.1 | - | | 0 |

[1]NA - not analyzed.
[2]Total of o-xylene, tolualdehyde, phthalaldehyde, methyl benzyl alcohol, toluic acid and 2-carboxybenzaldehyde.

Example A above is presented as a base point for comparing results of the present invention illustrated by Examples 1 and 2. Example B is presented to show that no effective catalysis provided by the system Zr—Br. Example C is presented to show the negative effect Zr has on the otherwise effective catalysis of the system Co—Br. Examples 1 and 2 where, respectively Mn is present with Co or alone establish that the negative catalysis of Zr is overcome by the presence of Mn and the surprising effect of Zr, which in solution forms only covalent compounds and has only a single oxidation state, during the period of maximum oxygen consumption. The effect of non-varient valent Zr surprisingly drastically effects depletion of partially oxidized o-xylene (e.g., o-toluic acid, 2-carboxybenzaldehyde and phthalide) to increase o-phthalic acid yield more than five fold.

The following data is for pseudocumene oxidation wherein the ring accountability balance (% Ring Recovery) is rather low both in comparative Example D and illustrative Example 3 because the concentrations of catalyst that were used were much lower than those used commercially, and because staged catalyst addition is necessary to give good yields and accountability in pseudocumene oxidations. Staged catalysis was not used in these runs.

TABLE II

| ZIRCONIUM EFFECT ON PSEUDOCUMENE OXIDATION | | |
|---|---|---|
| Example | D | 3 |
| mg atom Zr/mole PSC | 0 | 1.13 |
| mg atom Co/mole PSC | 1.13 | 1.13 |
| mg atom Mn/mole PSC | 1.13 | 1.13 |
| mg atom Br/mole PSC | 4.52 | 4.52 |
| Total mg atoms Metals/mg atom Br | 0.5 | 0.75 |
| Conditions | | |
| Average Run Temp., °F. | 414 | 413 |
| Run Time, min. | 43 | 57 |
| Final % $O_2$ in Vent | 10.1 | 10.3 |
| Results | | |
| $O_2$ uptake, liters | 34.7 | 35.9 |
| liter $CO_2$/liter $O_2$ | .145 | .298 |
| Molar Yields, % | | |
| Trimellitic Acid | 14.6 | 39.2 |
| Dicarboxybenzyl aldehyde | 2.1 | 2.8 |
| Dimethyl Basic Acids | 3.1 | 0.4 |
| Methyl Dibasic Acids | 34.6 | 16.2 |
| Ring Recovery, % | 54.4 | 58.6 |

The following two tables present data concerning the oxidation of p-xylene to terephthalic acid in the before described semi-continuous manner. Examples E, F, H and I do not use Zr and are presented as base points for their comparative values. Example F using the system Zr—Co—Br again demonstrates the negative effect on the otherwise quite effective Co—Br catalysis system.

TABLE III

| | ZIRCONIUM EFFECT ON PARA-XYLENE OXIDATION SEMI-CONTINUOUS MANNER IN F-81 REACTOR | | | | | | | |
|---|---|---|---|---|---|---|---|---|
| Example | E | 4 | 5 | 6 | 7 | 8 | G | F |
| mg atom Zr/mole pX | 0 | 0.85 | 8.52 | 0 | 0.05 | 0.27 | 0.27 | 0.27 |
| mg atom Co/mole pX | 0.85 | 0.85 | 0.85 | 0.54 | 0.54 | 0.54 | 0 | 0.54 |
| mg atom Mn/mole pX | 2.60 | 2.60 | 2.60 | 1.62 | 1.62 | 1.62 | 1.62 | 0 |
| mg atom Br/mole pX | 4.32 | 4.32 | 4.32 | 2.16 | 2.23 | 2.43 | 1.89 | 0.81 |
| Total mg atom metals/mg atom Br | 0.8 | 1.0 | 2.82 | 1.0 | 1.0 | 1.0 | 1.0 | 1.0 |
| Conditions | | | | | | | | |
| Average Run Temp., °F. | 411 | 411 | 412 | 412 | 414 | 412 | 412 | 410 |
| Run Time, Min | 46 | 50 | 43 | 42 | 41 | 48 | 31 | 23 |
| Final % $O_2$ in Vent | 10.0 | 10.2 | 11.1 | 10.1 | 10.1 | 10.1 | 10.0 | 10.6 |
| Pumping Time 21.8 Mins. | | | | | | | | |
| Results | | | | | | | | |
| $O_2$ Uptake, liters[1] | 33.5 | 42.2 | 40.1 | 25.6 | 26.1 | 36.9 | 11.0 | 6.6 |
| Liter $CO_2$/liter $O_2$ | NA[2] | NA[2] | NA[2] | NA[2] | NA[2] | NA[2] | 0.228 | 0.293 |
| Molar Yields, % | | | | | | | | |
| Terephthalic Acid | 86.8 | 92.3 | 88.7 | 27.7 | 32.9 | 90.3 | | |
| Toluic Acid | 4.0 | 1.7 | 2.0 | 55.8 | 51.3 | 4.1 | | |
| 4-Carboxybenzaldehyde | 2.5 | 2.3 | 1.8 | 4.0 | 6.9 | 2.7 | | |
| Total Intermediates | 13.2 | 7.7 | 11.3 | 72.4 | 67.2 | 9.8 | | |
| C-7 Aromatics | 0.9 | 0.9 | 0.9 | 1.5 | 1.8 | 1.2 | | |
| C-9 Aromatics | 0.8 | 0.5 | 1.4 | 3.9 | 3.8 | 0.8 | | |
| Ring Recovery, | | | | | | | | |

TABLE III-continued

ZIRCONIUM EFFECT ON PARA-XYLENE OXIDATION SEMI-CONTINUOUS MANNER IN F-81 REACTOR

| Example | E | 4 | 5 | 6 | 7 | 8 | G | F |
|---|---|---|---|---|---|---|---|---|
| % | | 94 | 86 | 84 | 102 | 89 | 87 | |

(1)Total $O_2$ uptake for reaction and acetic acid burning.
(2)NA - not analyzed.

TABLE IV

ZIRCONIUM EFFECT ON PARA-XYLENE OXIDATION SEMI-CONTINUOUS IN F-71 REACTOR

| Example | H | 9 | I | 10 |
|---|---|---|---|---|
| mg atom Zr/mole pX | 0 | 0.25 | 0 | 0.25 |
| mg atom Co/mole pX | 0.5 | 0.5 | 0.25 | 0.25 |
| mg atom Mn/mole pX | 1.5 | 1.5 | 0.75 | 0.75 |
| mg atom Br/mole pX | 2.0 | 2.0 | 1.00 | 1.25 |
| Total mg atom Metals/ mg atom Br | 1.0 | 1.0 | 1.0 | 1.0 |
| Conditions | | | | |
| Average Run Temp.,°F. | 414 | 414 | 412 | 415 |
| Run Time, min. | 54 | 49 | 100 | 67 |
| Final % $O_2$ in Vent | 18.0 | 18.4 | 18.0 | 18.1 |
| Pumping time 41.9 minutes | | | | |
| Results | | | | |
| $O_2$ uptake, liters | 181.5 | 167.5 | 173.6 | 178.9 |
| liter $CO_2$/liter $O_2$ | .075 | .116 | .139 | .153 |
| Molar Yields, % | | | | |
| Terephthalic Acid | 97.5 | 98.4 | 96.3 | 96.0 |
| Toluic Acid | 0.3 | 0.1 | 0.9 | 0.5 |
| 4-carboxybenzaldehyde | 1.0 | 0.4 | 1.3 | 1.0 |
| Total Intermediates | 1.3 | 0.6 | 2.4 | 1.6 |
| C-7 Aromatics | 0.9 | 0.9 | 0.6 | 1.3 |
| C-9 Aromatics | 0.3 | 0.1 | 0.5 | 0.2 |
| Ring Recovery, % | 93 | 88 | 79 | 84 |
| Fluoresence of cake, % | 0.9 | 1.0 | 0.7 | 0.8 |
| Optical Density of cake | | | | |
| at 340 nm | 1.49 | 1.18 | 2.26 | 2.06 |
| at 400 nm | 0.18 | 0.18 | 0.16 | 0.18 |

By way of explanation of items in Table III and Table IV:

"Total Intermediates" is sum of p-xylene, tolualdehyde, terephthaladehyde, methyl benzyl alcohol, toluic acid and 4-carboxybenzaldehyde.

"C-7 Aromatics" is the sum of benzaldehyde and benzoic acid decarboxylation products.

"C-8 Aromatics" is the sum of methyl dibasic acids, trimellitic acid and trimesic acid.

The illustrative examples in Tables III and IV again demonstrate the surprising effect of Zr to enhance oxidation and cause oxidation of intermediate oxidation products to the final product, in this case terephthalic acid and at the same time lower the requirements of Co and Mn which are very active polyvalent catalyst components. The total effect of zirconium, as can be deduced from the data in the illustrative examples of o- and p-xylene oxidation, is not just an equivalent replacement of Co and/or Mn but rather is far beyond such equivalency with respect to obtensions of some product yield and qualtiy.

EXAMPLE 11

To further illustrate the benefits of zirconium the following air oxidation of o-xylene neat (no reaction solvent) is conducted batchwise in F-71 reactor before described. The reaction temperature is 400°F., throughout pressure is 300 psig and the total time is 160 minutes from oxidation initiation to termination. The reaction mixture charged consisted of:

1000 grams o-xylene
 6.0 grams cobaltous acetate tetrahydrate,
 7.0 grams manganous acetate tetrahydrate,
 6.36 grams zirconylacetate, and
 14.36 grams hydrobromic (48% HBr) acid.
 Zr:Co:Mn:Br = 3.0:3.0:3.0:9.0 (milligram atoms/mole o-xylene of catalyst components)

From the following mass balance:

| | |
|---|---|
| Materials charged: | 1033.72 grams (not including air) |
| Total oxygen consumed: | 705.0 grams |
| | 1738.72 grams |
| Materials recovered: | 1614 grams (TRE) |
| Materials burned: | 105 grams (from CO and $CO_2$ produced) |
| | 1719 grams | there is a 98% accountability for the o-xylene oxidation. From the total oxygen provided less the oxygen going to CO and $CO_2$ produced, it is determined that oxygen consumed by o-xylene oxidation amounted to 85 percent of the stoichiometric amount required to oxidize the unburned o-xylene to phthalic anhydride, the form of phthalic acid produced by the 400°F. oxidation. From analysis of the total reaction effluent (TRE) the following molar yields were calculated based on 1,000 grams o-xylene charged.

TABLE V

| Product | Molar % |
| --- | --- |
| Phthalic Anhydride | 61.0 |
| o-Toluic Acid | 0.97 |
| Phthalide | 3.95 |
| 2-Carboxybenzaldehyde | 1.88 |
| o-xylene | 0.1 |

In contrast to the foregoing Example II (Run 2033-140) there is used the same reaction temperature, pressure, reactor, and ingredients but omitting zirconyl acetate and terminating the oxidation 108 minutes from oxidation initiation because oxidation ceased. The mass balance calculation shows 97% accountability for materials charged but only 66% of the stoichiometric oxygen requirement to air oxidize the unburned o-xylene to phthalic anhydride was consumed. The oxygenated aromatic products obtained from the TRE and the calculated molar yields of products obtained based on 1000 grams o-xylene charged are:

TABLE VI

| Product | Molar Yield, % |
| --- | --- |
| Phthalic Anhydride | 26.5 |
| o-Toluic Acid | 32.7 |
| Phthalide | 10.0 |
| 2-Carboxybenzaldehyde | 11.2 |

TABLE VI-continued

| Product | Molar Yield, % |
| --- | --- |
| Benzoic Acid | 1.2 |
| o-xylene | 0.1 |

In view of the foregoing disclosure, the invention claimed is:

1. A method of oxidizing di- or trimethylbenzenes with molecular oxygen to benzene di- or tricarboxylic acid under liquid phase conditions at temperatures in the range of 130° to 275°C. which comprises conducting said oxidation in the presence of the catalyst system consisting essentially of a source of bromine with manganese or cobalt and manganese and zirconium as the sole non-polyvalent metal wherein said catalyst system contains for each gram mole of such methylbenzene from 2 to 5 milligram atoms of the transition metal, manganese or total of cobalt and manganese and from 2 to 10 milligram atoms of bromine and based on each milligram atom of such transition metal from 0.1 to 3.0 milligram atom of zirconium.

2. The method of claim 1 wherein acetic acid is used as reaction solvent and air as source of molecular oxygen.

3. The method of claim 2 wherein p-xylene is oxidized to terephthalic acid.

4. The method of claim 2 wherein o-xylene is oxidized to o-phthalic acid.

5. The method of claim 2 wherein pseudocumene is oxidized to trimellitic acid.

6. The method of claim 1 wherein o-xylene is oxidized with air to phthalic anhydride.

* * * * *

UNITED STATES PATENT OFFICE
CERTIFICATE OF CORRECTION

PATENT NO. : 3,920,735
DATED : 11/18/75
INVENTOR(S) : Wampfler et al

It is certified that error appears in the above-identified patent and that said Letters Patent are hereby corrected as shown below:

Column 9 Table IV (column 9), line 25 change "167.5" to --167.6--

Signed and Sealed this second Day of March 1976

[SEAL]

Attest:

RUTH C. MASON
Attesting Officer

C. MARSHALL DANN
Commissioner of Patents and Trademarks